United States Patent Office 3,072,438
Patented Jan. 8, 1963

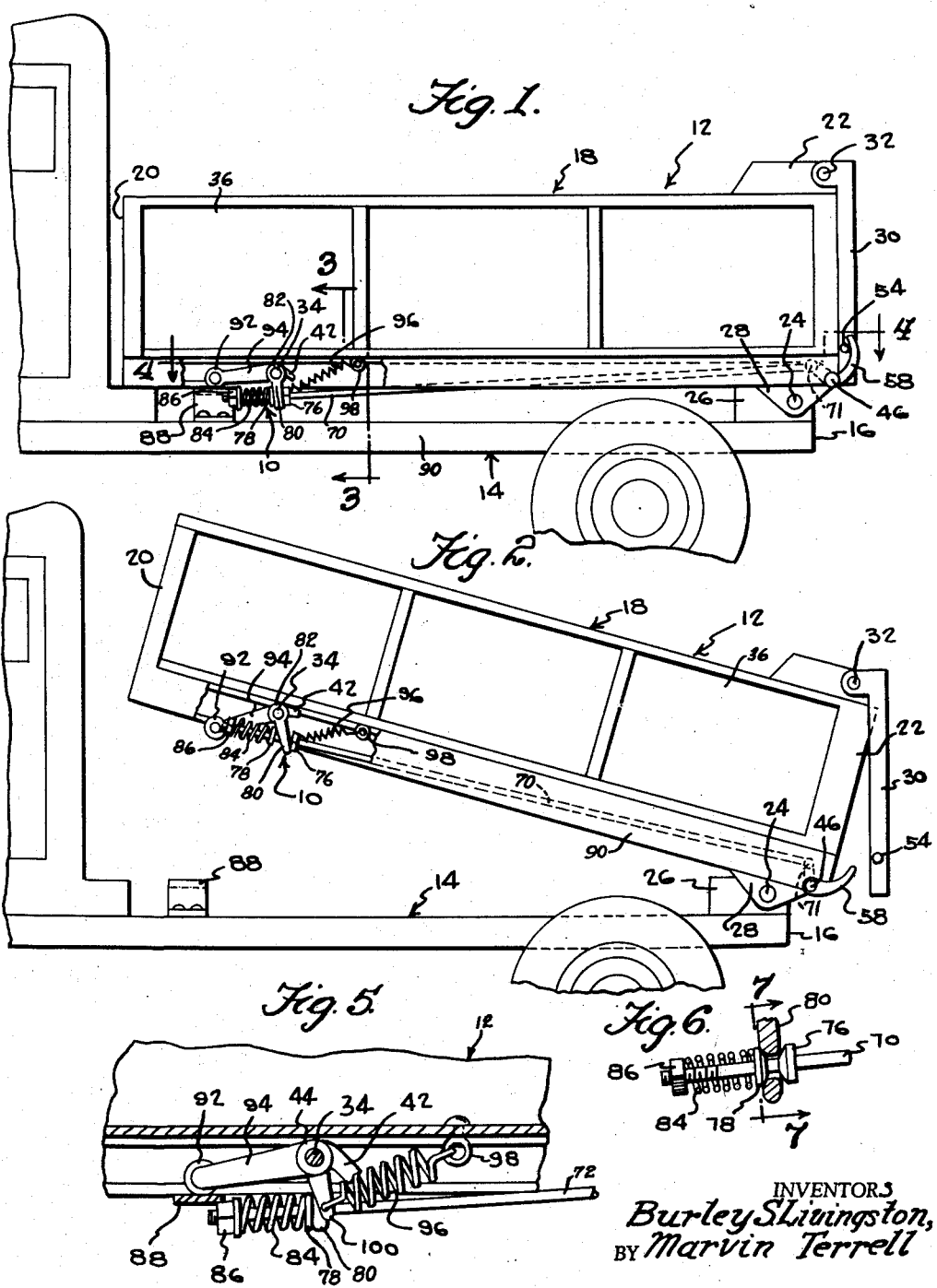
Jan. 8, 1963 B. S. LIVINGSTON ET AL 3,072,438
TILTING DUMP TRUCK END GATE LATCH MECHANISM
Filed Jan. 31, 1958 2 Sheets-Sheet 1
INVENTORS
Burley S. Livingston,
BY Marvin Terrell
McMorrow, Berman & Davidson
ATTORNEYS

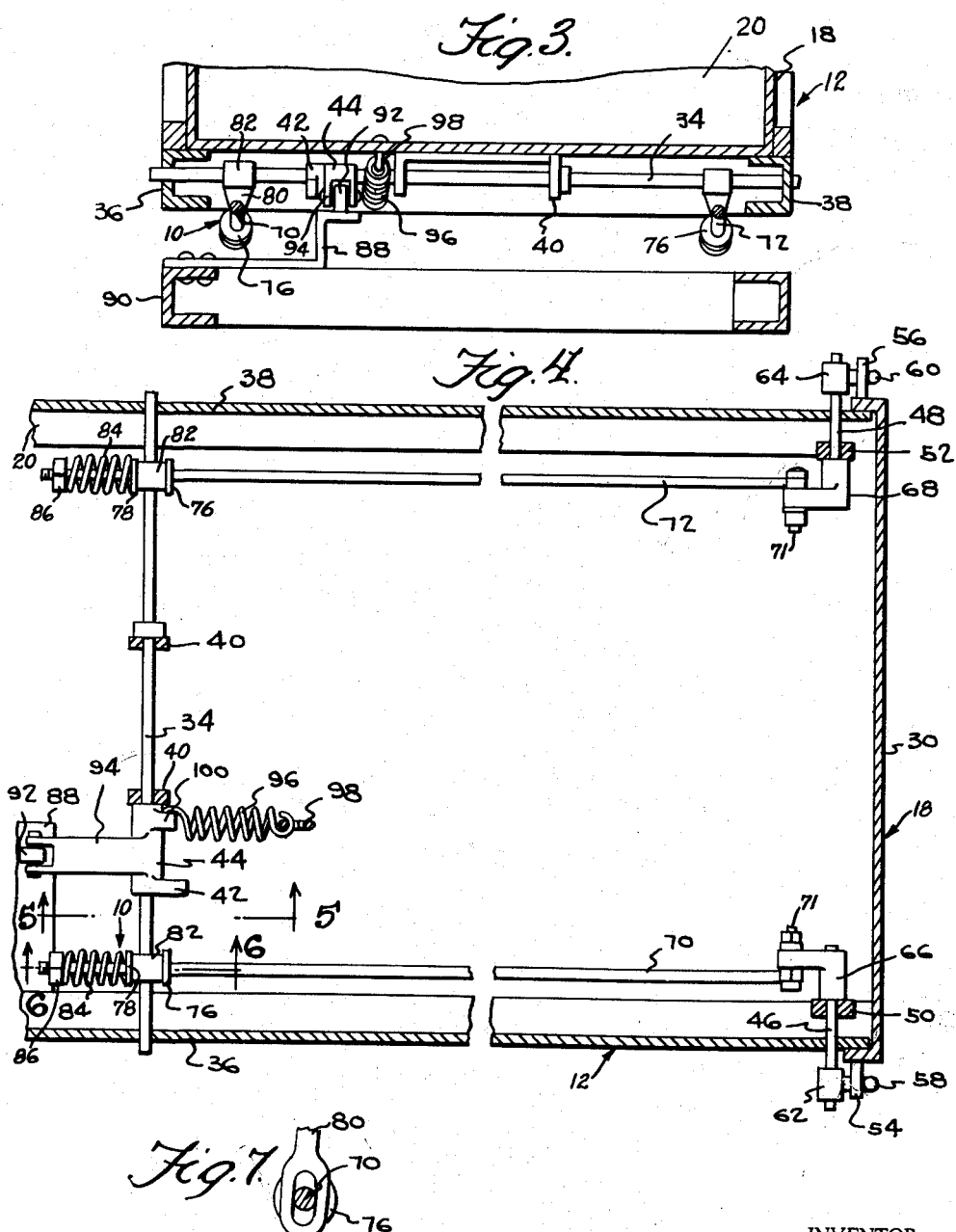

3,072,438
TILTING DUMP TRUCK END GATE LATCH MECHANISM
Burley S. Livingston, P.O. Box 183, Moorhead, Miss., and Marvin Terrell, Indianola, Miss.
Filed Jan. 31, 1958, Ser. No. 712,500
3 Claims. (Cl. 298—23)

The present invention relates to dump trucks generally and in particular to a latch mechanism for the end gate of a dump truck.

An object of the present invention is to provide an end gate latch mechanism for a dump truck which is automatic in operation, one which securely locks the end gate of the dump truck in the closed position when the dump truck is in the transport condition, and one which automaticallly releases the end gate when the dump body of the dump truck is raised to discharge the contents thereof.

Another object of the present invention is to provide an end gate latch mechanism for a dump truck which is not damaged by the closing of the end gate upon an obstruction of small size which normally would put a strain on a latch mechanism for such end gate, one which is sturdy in construction, one simple in structure readily installed upon any and all styles of dump trucks, and one which is economically feasible.

These and other objects and advantages of the present invention will be fully apparent from the following description when taken in conjunction with the annexed drawings, in which:

FIGURE 1 is a fragmentary elevational view of a dump truck, with the latch mechanism of the present invention installed thereon, showing the dump body in the horizontal position with the end gate locked;

FIGURE 2 is a fragmentary elevational view of the assembly of FIGURE 1, showing the dump body in the upwardly sloping position with the end gate released and open;

FIGURE 3 is a sectional view, taken on the line 3—3 of FIGURE 1;

FIGURE 4 is a sectional view, taken on the line 4—4 of FIGURE 1;

FIGURE 5 is a sectional view, taken on the line 5—5 of FIGURE 4;

FIGURE 6 is a sectional view, taken on the line 6—6 of FIGURE 4; and

FIGURE 7 is a sectional view, taken on the line 7—7 of FIGURE 6.

Referring in greater detail to the drawings in which like numerals indicate like parts throughout the several views, the latch mkechanism of the present invention is designated generally by the reference numeral 10 and is shown installed upon a dump truck in FIGURES 1 and 2, the truck being designated generally by the reference numeral 12.

The truck 12 has a mobile body frame 14 including a rearward end 16 of such frame and a horizontally disposed dump body 18 having a closed forward end 20 and an open rearward end 22. The dump body 18 is positioned in superimposed relation upon the frame 14 so that it is longitudinal with respect to the frame 14 and extends inwardly from the rearward end 16 of the frame 14. The rearward end 22 of the dump body 18 is adjacent and overhangs the rearward end 16 of the frame 14 and the forward end 20 of the dump body 18 is spaced inwardly from the rearward end 16 of the frame 14.

A pair of hinge pins 24, only one of which is shown in FIGURES 1 and 2, extend through sets of trunnions 26 rising from the rearward end 16 of the frame 14 and through depending brackets 28 which are carried on the underside of the dump body 18 adjacent the rearward end 22 of the latter. The hinge pins 24 connect the dump body 18 to the frame 14 for movement from the horizontal position shown in FIGURE 1 to a position in which the dump body 18 slopes upwardly with the forward end 20 spaced above the frame 14, as shown in FIGURE 2.

A vertically disposed gate 30 extends over and closes the rearward end of the dump body 18 and is connected at its upper end by means of hinge pins 32 to the adjacent portion of the rearward end 22 of the dump body 18 for swinging movement from the vertical closed position to a vertical open position when the dump body 18 has been moved to the upwardly sloping position responsive to the force of gravity thereto.

The present invention, of a releasable latch mechanism 10, comprises a shaft 34 arranged transversely of and beneath the bottom the the dump body 18 adjacent the forward end 20 of the body 18.

The shaft 34 has its end portions journaled in the side members 36 and 38 of the truck frame 14, as shown in FIGURE 3, and has its midportion extending through and journaled in the legs of an inverted U-shaped bracket 40 having the bight dependingly secured to the underside of the dump body 18.

The shaft 34 is rotatable in clockwise and counterclockwise directions for a limited part of one revolution, there being provided a stop 42 on one portion of a sleeve member 44. The sleeve member 44 is fixedly secured to the shaft 34 immediately adjacent one of the legs of the bracket 40. The stop 42 engages the bottom of the dump body 18 when the dump body is raised to the upwardly sloping position as shown in FIGURE 2. When the body is in the horizontal position as in FIGURE 1, the stop 42 is out of engagement with the dump body bottom.

The latch mechanism of the present invention includes a pair of spaced latch elements engaging complemental holding means carried by the gate 30 adjacent the lower end of the latter. The holding means embodies horizontally disposed studs 54 and 56 which project outwardly from the ends of the gate 30. The latch elements are curved arms 58 and 60 each carried on a cylindrical member 62 and 64, respectively, mounted upon the projecting end portions of the stub shafts 46 and 48, as shown in FIGURE 4. A crank member 66 is carried upon the inner end portion of the shaft 46 and a similar crank member 68 is carried upon the inner end portion of the shaft 48.

Means is provided connecting the arms 58 and 60, constituting the latch elements, to the shaft 34 for movement therewith. This means embodies a link member 70 extending in parallel spaced relation with respect to the frame side member 36 and another link member 72 similarly positioned with respect to the frame side member 38. The adjacent ends of the link members 70 and 72 are pivotally connected by pins 71 to the arms of the crank members 66 and 68, respectively, and the other adjacent ends extend to points beyond the shaft 34 and are slidably connected to the shaft 34. The means slidably connecting the link members 70 and 72 to the shaft 34 are shown in FIGURES 4 to 7, inclusive, with respect to the link member 70. This means consists in a fixed collar 76 secured to the link member 70 inwardly of the end remote from the gate 30 and another collar 78 positioned outwardly of the collar 76 and slidable on the adjacent portion of the link member 70. The link member 70 extends through an aperture provided in an arm 80 adjacent the free end of the latter, the arm 80 being fixedly mounted on a sleeve 82 which is fixedly secured to the portion of the shaft 34 intermediate the collars 76 and 78. A coil spring 84 is circumposed about the portion of the link member 70 outwardly of the collar 78 and has one end bearing against the collar 78 and the other end bearing against a nut 86 which is threadedly engaged on the threaded end portion of the link member 70, as shown in FIGURE 6.

A Z-shaped bracket 88, constituting a fixed ledge, is carried by the frame side member 90, as shown in FIGURE 3, and a roller 92 journalled in the free end portion of an arm 94 normally rests upon and engages the upper face of the free end of the bracket 88, as shown in FIGURES 1 and 3, when the dump body 18 is in the horizontal position. The arm 94 projects from the sleeve 44 on the side opposite to the stop 42. The arm 94 constitutes the actuating arm for the latch element of the latch mechanism of the present invention.

Spring means is provided which is connected to the shaft 34 and to the dump body 18 for effecting the rotary movement of the shaft 34 in the counterclockwise direction. This spring means consists in a coil spring 96 having one end fastened in an eye formation or eyelet 98 provided in the underside of the dump body 18, the other end of the spring 96 being fixed to a short projecting stub arm 100 which is carried and fixedly secured to the sleeve 44 on the end of the sleeve 44 remote from the stop 42, as shown most clearly in FIGURE 4.

In operation, suitable elevating means (not shown) is installed in the truck frame 14 and connected to the underside of the dump body 18 in the conventional manner for raising the dump body 18 from the horizontal position to the upwardly sloping position. When the dump body 18 is in the horizontal position the roller 92 engages the upper face of the bracket 88 on the free end of the latter and effects the rotation of the shaft 34 in the clockwise direction, stretching the spring 96. This rotation of the shaft 34 also effects the forward movement of the associated link members 70 and 72 to turn the arms 58 and 60 in counterclockwise directions so that they engage the studs 54 and 56, respectively, to hold the gate 30 in the closed position. Upon elevation of the dump body 18, as shown in FIGURE 2, the spring 96 urges the shaft 34 to the limit of its counterclockwise movement and effects the shifting of the link members 70 and 72 rearwardly and the subsequent clockwise turning movement of the arms 58 and 60 to the position in which they are disengaged from the respective studs 54 and 56, freeing the gate 30 for swinging movement from the position closing the end of the dump body 18 to an open position responsive to the force of gravity on the gate 30.

An important feature of the present invention is that upon closing movement of the gate 30 should any obstruction get between the end of the dump body 18 and the gate 30 and prevent the gate 30 from entirely closing the end of the dump body 18, the arms 58 and 60, upon engagement of the studs 54 and 56, will be held from the completely closed position and the associated springs 84 will be compressed between the associated nut 86 and the adjacent collar 78 permitting the arms 58 and 60 to engage the associated studs 54 and 56 without excessive strain to the arms 58 and 60 thereby preventing damage to the latch mechanism until the obstruction to the gate 30 is removed.

While only a preferred embodiment of the present invention has been shown and described, other embodiments are contemplated and numerous changes and modifications may be made therein without departing from the spirit of the invention as set forth in the appended claims.

What is claimed is:

1. The combination with a mobile body frame having a rearward end, a horizontally-disposed dump body having a closed forward end and an open rearward end positioned upon said frame so that it extends longitudinally inwardly from the rearward end of said body frame with the rearward end adjacent the rearward end of said body frame and the forward end spaced inwardly from the rearward end of said body frame and pivotally connected adjacent the rearward end to said body frame for movement from the horizontal position to a position in which said dump body slopes upwardly with the forward end spaced above said body frame, a vertically-disposed gate extending over and closing the rearward open end of said body and connected at the upper end of said dump body for swinging movement from the vertical closed position to an open position, of a releasable latch mechanism comprising a shaft arranged transversely of and beneath the bottom of said dump body adjacent the forward end thereof and journaled in said dump body for rotary movement in clockwise and counterclockwise directions, a pair of link members arranged in parallel spaced relation positioned transversely of said shaft and having one of the complemental ends slidably connected to said shaft through an arm secured to said shaft for movement of said link members transversely of said shaft, the link members being actuable responsive to the movement of said shaft, a stub shaft mounted on said dump body and disposed transversely of each link member and adjacent the other end of each of said link members, a crank member secured to each of said stub shafts, the other end of each of said link members being pivotally connected to the adjacent crank member, a latch element on said stub shaft and releasably engaging means provided on said gate adjacent the lower end thereof for retaining said gate in the closed vertical position, a fixed ledge carried by said frame adjacent the forward end of said dump body, an actuating arm fixedly carried by said shaft and normally having the free end in resting engagement with said ledge, and spring means connected to said shaft and dump body for effecting the rotary movement of said shaft in the counterclockwise direction, said dump body upon execution of the movement from the horizontal position to the upwardly-sloping position releasing the free end of said arm from resting engagement with said ledge, permitting said shaft to rotate in the counterclockwise direction under the action of said spring means, effecting the disengagement of said latch elements from said gate-holding means, and permitting said gate to swing under the action of gravity from the closed position to the open position.

2. The combination with a mobile body frame having a rearward end, a horizontally-disposed dump body having a closed forward end and an open rearward end positioned upon said frame so that it extends longitudinally inwardly from the rearward end of said body frame with a rearward end adjacent the rearward end of said body and the forward end spaced inwardly from the rearward end of said body frame and pivotally connected adjacent the rearward end to said body frame for movement from the horizontal position to a position in which said dump body slopes upwardly with the forward end spaced above said body frame, a vertically-disposed gate extending over and closing the rearward open end of said body and connected at the upper end to said dump body for swinging movement from the vertical closed position to an open position, of a releasable latch mechanism comprising a shaft arranged transversely of and beneath the bottom of said dump body adjacent the forward end thereof and journaled in said dump body for rotary movement in clockwise or counterclockwise directions, a pair of link members arranged in parallel spaced relation positioned transversely of said shaft and having one of the complemental ends slidably connected to said shaft through an arm secured to said shaft for movement of said link members transversely of said shaft, said link members being actuable responsive to the movement of said shaft, a stub shaft mounted on said dump body and disposed transversely of each link member and adjacent the other end of each of said link members, a crank member secured to each of said stub shafts, the other end of each of said link members being pivotally connected to the adjacent crank mmeber, a curved arm on each stub shaft and releasably engaging a stud provided on said gate adjacent the lower end thereof for retaining said gate in the closed vertical position, a fixed ledge carried by said frame adjacent the forward end of said dump body, an actuating arm fixedly carried by said shaft and normally having the free end in resting engagement with said ledge, and spring means connected to said shaft and said dump body for effecting the rotary movement of said shaft in the counterclockwise direction, said dump body upon execution of the movement from the horizontal position to the upwardly-sloping position releasing the free end of said arm from resting engagement with said ledge, permitting said shaft to rotate in the counterclockwise direction under the action of said spring means, effecting the disengagement of said latch element from said gate studs, permitting said gate to swing under the action of gravity from the closed position to the open position.

3. The combination with a mobile body frame having a rearward end, a horizontally-disposed dump body having a closed forward end and an open rearward end positioned upon said frame so that it extends longitudinally inwardly from the inward end of said body frame with the rearward end adjacent the rearward end of said body frame and the forward end spaced inwardly from the rearward end of said body frame and pivotally connected adjacent the rearward end to said body frame for movement from the horizontal position in which said dump body slopes upwardly with the forward end spaced above said body frame, a vertically-disposed gate extending over and closing the rearward open end of said body and connected at the upper end to said dump body for swinging movement from the vertical closed position to an open position, of a releasable latch mechanism comprising a shaft arranged transversely of and beneath the bottom of said dump body adjacent the forward end thereof and journaled in said dump body for rotary movement in clockwise and counterclockwise directions, a pair of link members arranged in parallel spaced relation positioned transversely of said shaft and having one of the complemental ends slidably connected to said shaft through an arm secured to said shaft for movement of said link members transversely of said shaft, said link members being actuable responsive to the movement of said shaft, a stub shaft mounted on said dump body and disposed transversely of each link member and adjacent the other end of each of said link members, a crank member secured to each of said stub shafts, the other end of each of said link members being pivotally connected to the adjacent crank member, a curved arm on each stub shaft and releasably engaging a stud provided on said gate adjacent the lower end thereof for retaining said gate in the closed vertical position, a fixed ledge carried by said frame adjacent the forward end of said dump body, a sleeve member circumposed about and fixedly secured to said shaft, an actuating arm carried by said sleeve member normally having the free end in resting engagement with said ledge, and a coil spring connected to said sleeve and said dump body for effecting the rotary movement of said shaft in the counterclockwise direction, said dump body upon execution of the movement from the horizontal position to the upwardly sloping position releasing the free end of said arm from resting engagement with said ledge, permitting said shaft to rotate in the counterclockwise direction under the action of said spring means, effecting the disengagement of said latch elements from said gate-holding means, and premitting said gate to swing under the action of gravity from the closed position to the open position.

References Cited in the file of this patent

UNITED STATES PATENTS

| | | |
|---|---|---|
| 1,243,635 | Schulz | Oct. 16, 1917 |
| 1,456,630 | Eaton et al. | May 29, 1923 |
| 2,174,956 | Allison | Oct. 3, 1939 |
| 2,261,745 | Sand | Nov. 4, 1941 |
| 2,410,046 | Burns | Oct. 29, 1946 |
| 2,635,919 | Watson | Apr. 21, 1953 |

FOREIGN PATENTS

| | | |
|---|---|---|
| 143,979 | Australia | Aug. 17, 1950 |
| 476,394 | Canada | Aug. 28, 1951 |
| 649,202 | Great Britain | Jan. 24, 1951 |